United States Patent
Hughes, Jr. et al.

(10) Patent No.: US 7,775,584 B2
(45) Date of Patent: Aug. 17, 2010

(54) IMPACT ABSORBING ARMREST FOR A MOTOR VEHICLE

(75) Inventors: Larry Gene Hughes, Jr., Lewis Center, OH (US); Ryan Van Voorhis, Powell, OH (US); Akira Miyazaki, Powell, OH (US); Craig Allen Markusic, Marysville, OH (US); Christopher Mampe, Delaware, OH (US); Takayuki Sugama, Dublin, OH (US); Peter J. Cardimen, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/102,475

(22) Filed: Apr. 14, 2008

(65) Prior Publication Data
US 2009/0256384 A1  Oct. 15, 2009

(51) Int. Cl.
B60R 21/04 (2006.01)
B60N 2/46 (2006.01)

(52) U.S. Cl. .................. 296/187.05; 296/1.09; 296/153
(58) Field of Classification Search ............ 296/187.05, 296/187.12, 1.09, 153; 297/411.2, 411.21, 297/411.22
See application file for complete search history.

(56) References Cited

U.S. PATENT DOCUMENTS

| | | | |
|---|---|---|---|
| 3,362,749 A * | 1/1968 | Clement ................. 297/411.21 |
| 3,989,275 A | 11/1976 | Finch et al. |
| 4,226,464 A * | 10/1980 | Janz et al. .................... 296/153 |
| 4,869,543 A * | 9/1989 | Grimes ........................ 296/153 |
| 5,141,279 A | 8/1992 | Weller |
| 5,154,445 A | 10/1992 | Weller |
| 5,356,177 A | 10/1994 | Weller |
| 5,395,161 A * | 3/1995 | Spykerman et al. ...... 297/411.2 |
| 5,445,430 A | 8/1995 | Nichols |
| 5,573,272 A | 11/1996 | Teshima |
| 5,716,093 A * | 2/1998 | Sadr ........................ 296/146.6 |
| 5,967,594 A * | 10/1999 | Ramanujam ................. 296/153 |
| 6,142,563 A | 11/2000 | Townsend et al. |
| 6,893,077 B1 * | 5/2005 | DeJongh ................. 296/187.05 |
| 6,899,363 B2 * | 5/2005 | Dry ............................ 296/1.09 |
| 7,070,221 B2 | 7/2006 | Cowelchuk et al. |
| 7,104,590 B2 * | 9/2006 | Dooley et al. ................ 296/153 |
| 2005/0194806 A1 * | 9/2005 | Cowelchuk et al. ........ 296/1.09 |
| 2006/0082175 A1 * | 4/2006 | Cowelchuk et al. ........ 296/1.09 |
| 2007/0080562 A1 * | 4/2007 | Taniguchi et al. ...... 296/187.05 |
| 2007/0236032 A1 * | 10/2007 | Osada ........................ 296/1.08 |
| 2007/0246925 A1 | 10/2007 | Mani |
| 2009/0146480 A1 * | 6/2009 | Knowlden ................ 297/411.2 |

FOREIGN PATENT DOCUMENTS

| JP | 04-169346 | 6/1992 |
|---|---|---|
| JP | 09-099768 | 4/1997 |
| JP | 11-139232 | 5/1999 |
| JP | 2008-74009 A * | 4/2008 |

* cited by examiner

Primary Examiner—Jason S Morrow
(74) Attorney, Agent, or Firm—Plumsea Law Group, LLC

(57) ABSTRACT

A collision absorption system including a collapsing armrest. The armrest is configured to provide support for vertical loading during use. During a side impact collision, the armrest is configured to deform or collapse in a lateral direction. The collapsing armrest may include multiple layers with at least one layer having grooves and channels, or containing cross-ribs, to allow greater deflection in a lateral direction during a side impact collision.

29 Claims, 11 Drawing Sheets

IMPACT ABSORBING ARMREST FOR A MOTOR VEHICLE

BACKGROUND OF THE INVENTION

1. Field of the Invention

The present invention relates generally to motor vehicles and in particular to an impact absorbing armrest for a motor vehicle.

2. Description of Related Art

Osada (U.S. patent application publication number 2007/0236032) teaches an interior trim for an automobile. Osada teaches an interior trim with an armrest projecting from a trim body which supports the armrest. Osada teaches an armrest including a core member, a lower pad layer, an upper pad layer and a skin unit for covering surfaces of the armrest. Osada also teaches that a container portion of the core member is provided with multiple holes arranged in the longitudinal direction of the car body with spaces interposed in between in a car width direction. Osada teaches that the holes are provided to help deformation or breakage of the structure when load in the car width direction is applied to the core member.

Osada also teaches another embodiment of the armrest that includes bellows. Osada teaches that the bellows have a serrated cross section. Osada teaches that when an external force is applied from a side, the bellows shrink, and can be easily deformed in the car width direction.

Nichols (U.S. Pat. No. 5,445,430) teaches a collapsing armrest construction. Nichols teaches a collapsible armrest including a flexible skin covering, a plastic insert and a foam material. The insert includes a plurality of corrugations so that the shell collapses in the lateral direction when the armrest is subjected to a side load of the type experienced in a side impact collision.

Prior to an impact, the armrest includes an empty chamber that is in fluid communication with ambient air via a vent. The vent is covered by a rupturable membrane. The chamber is vented to accommodate normal changes in ambient conditions so that the insert does not expand or contract in response to ordinary temperature changes. During a collision, the membrane can rupture to avoid pneumatic delay in lateral collapse of the insert.

Ura et al. (Japanese patent number 11-139232) teaches an armrest for an automobile obtaining sufficient shock absorbing action and energy absorbing action by a simple structure. Ura teaches an armrest comprising a core plate with multiple lateral slits. Ura teaches that the lateral slits are used to give flexibility to the armrest to provide sufficient shock absorption.

SUMMARY OF THE INVENTION

A deforming armrest for a motor vehicle is disclosed. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUVs, motorcycles, scooters, boats, personal watercraft, and aircraft.

In one aspect, the invention provides an armrest for a motor vehicle, comprising: a support member attached to a fixed portion of the motor vehicle and configured to provide vertical support for the armrest under a vertical load applied by an arm of an occupant; the support member including a plurality of grooves extending in a direction that is generally perpendicular to a lateral direction, the lateral direction being a direction between an occupant and the fixed portion of the motor vehicle; the support member further including a plurality of channels extending in a direction different from the direction perpendicular to the lateral direction; and where the plurality of channels have an alternating configuration.

In another aspect, the plurality of grooves are open on an upper surface of the support member.

In another aspect, the plurality of channels are open on the upper surface of the support member and where the plurality of channels are open on a lower surface of the support member.

In another aspect, the plurality of channels includes a first set of channels extending from a first side of the support member and wherein the plurality of channels includes a second set of channels extending from a second side of the support member.

In another aspect, the first set of channels is interdigitated with the second set of channels.

In another aspect, the channels help facilitate shearing of the support member during a side impact.

In another aspect, the invention provides an armrest for a motor vehicle, comprising: a support member attached to a fixed portion of the motor vehicle and configured to provide vertical support for the armrest under a vertical load applied by an arm of an occupant; the support member including a plurality of grooves extending in a direction that is generally perpendicular to a lateral direction, the lateral direction being a direction between an occupant and the fixed portion of the motor vehicle; the support member further including a plurality of channels extending in a direction different from the direction perpendicular to the lateral direction; and where the plurality of channels are configured to intersect with the plurality of grooves.

In another aspect, an angle formed between a first channel and a first groove is an acute angle.

In another aspect, the grooves extend through a majority of a length of the support member.

In another aspect, a first channel has a first end open to a portion of a first groove.

In another aspect, the support member includes a plurality of holes disposed on an outer periphery of the support member.

In another aspect, a second channel has a first end open to a portion of a first hole of the plurality of holes.

In another aspect, the invention provides an armrest for a motor vehicle, comprising: a support member attached to a fixed portion of the motor vehicle and configured to provide vertical support for the armrest under a vertical load applied by an arm of an occupant; the support member including a substantially flat support portion and a rib projecting away from the substantially flat support portion; the rib extending in a direction that is generally perpendicular to a lateral direction, the lateral direction being a direction between an occupant and the fixed portion of the motor vehicle; and where the rib is configured to substantially reinforce the support member in a vertical direction and wherein the rib is configured to provide lateral deformation when a lateral load is applied to the armrest.

In another aspect, the rib is disposed below the substantially flat support portion.

In another aspect, the rib includes a hollow cavity that extends through a substantial majority of the rib in the direction perpendicular to the lateral direction.

In another aspect, the rib includes a first leg portion and a second leg portion; and wherein the first leg portion and the second leg portion are spaced apart at a first end portion of the rib, and wherein the first end portion is associated with the substantially flat support portion.

In another aspect, the first leg portion and the second leg portion are closed at a second end portion, the second end portion being disposed further away from the substantially flat support portion than the first end portion.

In another aspect, the first leg portion and the second leg portion are spaced apart at a second end portion, the second end portion being disposed further away from the substantially flat support portion than the first end portion.

In another aspect, the first leg portion and the second leg portion are configured to contact one another at the first end portion of the rib when a lateral force is applied to the armrest.

In another aspect, the support member includes a first rib and a second rib, and where the first rib and the second rib are configured to contact one another when a lateral force is applied.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
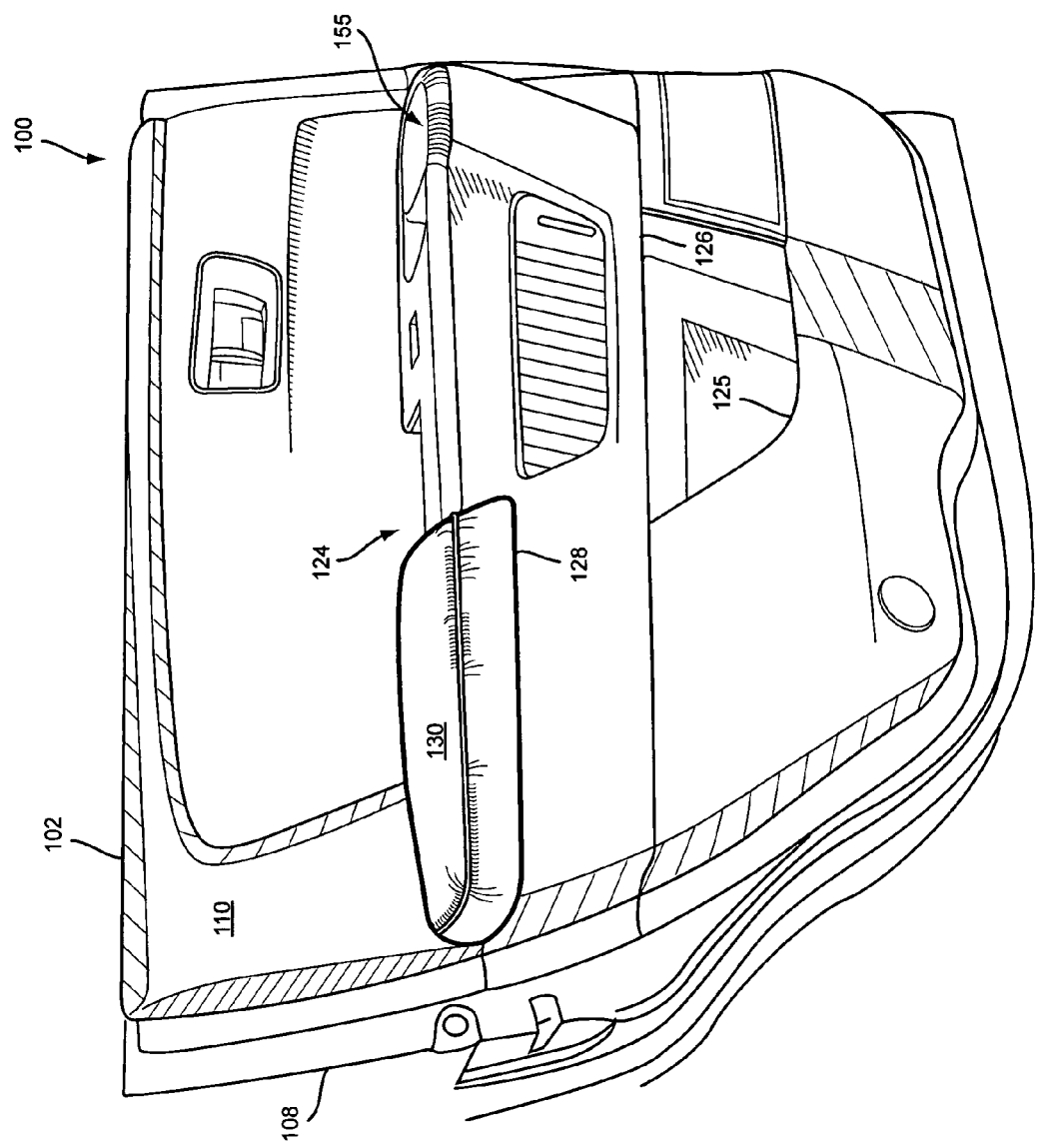
FIG. 1 is an isometric view of a preferred embodiment of a vehicle door including an armrest.

FIG. 1 illustrates an isometric view of a vehicle door including a collision absorption system, according to one embodiment of the invention. Preferably, one or more doors of a motor vehicle include provisions to prevent or reduce occupant injury in a collision. While the following disclosure teaches an exemplary system and method for use with a front side passenger, all of the principles, teachings and concepts are also applicable to any other occupant in a motor vehicle.

In describing directions associated with various components of the collision absorption system, the terms "lateral direction" as well as "longitudinal direction" may be used. The term "lateral direction" as used throughout this detailed description refers to a direction running between a motor vehicle occupant and a fixed portion of a motor vehicle that is used to attach a deforming armrest. In some cases, the lateral direction may run between two sides of a motor vehicle. The term "longitudinal direction" as used throughout this detailed description and in the claims refers to a direction that is perpendicular to the lateral direction. In some cases, the longitudinal direction may run between a front of a motor vehicle and a back of a motor vehicle.

In some embodiments, a door may include an outer shell that is associated with an exterior of a motor vehicle. During a collision, the outer shell may be the first portion of the motor vehicle door that is contacted. Additionally, in some embodiments, a door may include an inner shell that is associated with an interior of a motor vehicle. In some cases, the inner shell may be further associated with an interior trim panel. In a preferred embodiment, a door may include additional provisions for absorbing the force of a collision and helping to protect a vehicle occupant.

Referring to FIG. 1, collision absorption system 100 may be associated with door 102. Generally, collision absorption system 100 may include various components including an armrest, pads and other components. Additionally, door 102 may be associated with additional features not directly related to collision absorption system 100. For purposes of illustration, only some components associated with door 102 are illustrated in the current embodiment. It should be understood, however, that door 102 can also include additional features not illustrated here.

Preferably, door 102 may include inner shell 108 disposed towards an interior compartment of a motor vehicle. In some embodiments, inner shell 108 comprises the steel structure of door 102. In other embodiments, inner shell 108 could be associated with another reinforcing structure. For example, some embodiments include interior trim panel 110 that is associated with inner shell 108. In some cases, interior trim panel 110 faces an interior compartment of the motor vehicle and can provide a finish to door 102.

In some embodiments, interior trim panel 110 includes armrest 124 that is mounted to interior trim panel 110. Additionally, interior trim panel 110 can include storage pocket 125. In other embodiments, interior trim panel 110 may include additional provisions, including storage compartments, vents, electrical window or door lock controls and speakers as well as other provisions.

Armrest 124 can include handle portion 126 as well as resting portion 128. Preferably, handle portion 126 can include a handlebar, recess or other provision that facilitates opening and closing of door 102. Likewise, resting portion 128 can be used to support a hand or arm of a vehicle occupant. In particular, resting portion 128 may include resting surface 130 that provides a generally flat and smooth surface for a hand and/or arm. In some embodiments, armrest 124 can include additional provisions for storage, including, but not limited to, additional storage compartments and cup holders. In this preferred embodiment, armrest 124 includes cup holder 155.

Preferably, an armrest of a motor vehicle is configured to provide support for vertical loading. In other words, the armrest is preferably configured to support the weight of a hand and/or arm of an occupant. During a side impact collision, however, an armrest may also preferably include provisions for deforming in a lateral direction to reduce the force of impact between the armrest and any portion of an occupant. In a preferred embodiment, the armrest may be constructed to be weak with respect to lateral loads that are applied during a side impact collision.

Figure 2:
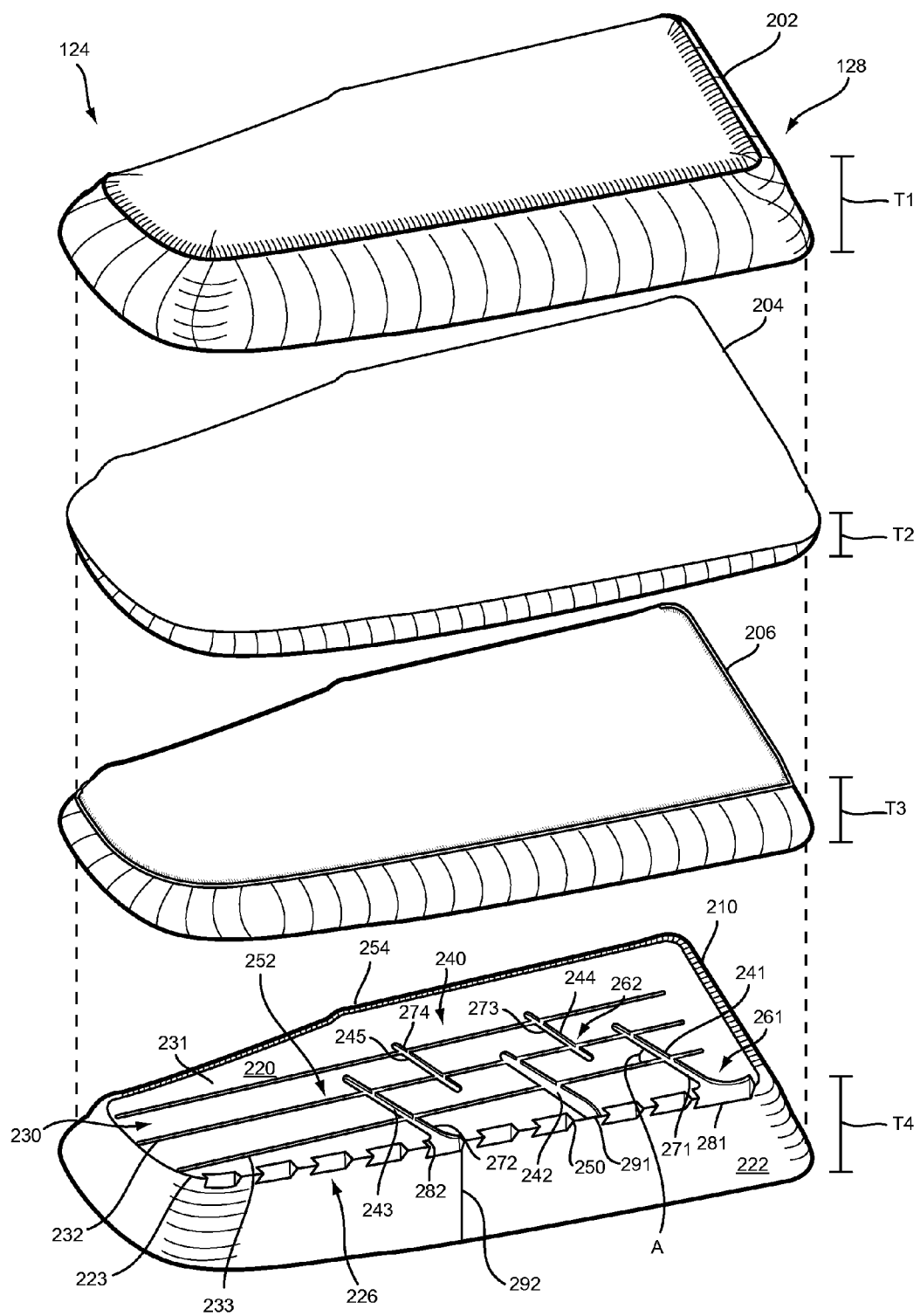
FIG. 2 is an exploded isometric view of preferred embodiment of a portion of an armrest.

FIG. 2 illustrates an exploded isometric view of a preferred embodiment of a portion of armrest 124. Throughout the remainder of this detailed description, only resting portion 128 of armrest 124 may be illustrated. However, it should be understood that in some embodiments, the same principles discussed for resting portion 128 could also be applied to any other portion of armrest 124, including handle portion 126.

Armrest 124 may include multiple layers. In this embodiment, armrest 124 includes outer cover 202. Generally, outer cover 202 may include provisions for covering the interior structure of armrest 124. In some cases, outer cover 202 may wrap around the entirety of armrest 124 to provide a single continuous outer surface for armrest 124. In other cases, outer cover 202 may wrap around only a portion of armrest 124.

Armrest 124 may also include one or more cushioning layers. In this embodiment, armrest 124 comprises first cushioning layer 204 and second cushioning layer 206. Generally, first cushioning layer 204 and second cushioning layer 206 may be configured to provide some flexibility for armrest 124 as a hand and/or arm are rested on armrest 124. In some embodiments, first cushioning layer 204 may have different deformation characteristics from second cushioning layer 206. In other embodiments, first cushioning layer 204 and second cushioning layer 206 could provide similar deformation characteristics. In a preferred embodiment, each cushioning layer can be provided with slightly different deformation characteristics to fine tune the degree of cushioning provided by armrest 124.

Armrest 124 can also include additional provisions for supporting vertical loads. In this embodiment, armrest 124 includes support member 210. Generally, support member 210 could be any component that is configured to provide structure to armrest 124. In some embodiments, support member 210 may be more rigid than a covering layer or a cushioning layer. This configuration can allow support member 210 to provide support for vertical loading.

Generally, each component can be made of any materials known in the art. For example, outer cover 202 could be made of any material including, but not limited to natural leather, synthetic leather, natural fibers, synthetic fibers, cloth, rubber, plastic, metal, wood as well as any other material. In a preferred embodiment, outer cover 202 could be made of synthetic leather. Likewise, first cushioning layer 204 and second cushioning layer 206 could be made of materials including, but not limited to, foam, rubber, natural or synthetic fibers as well as any other material. In a preferred embodiment, first cushioning layer 204 could be made of a first type of foam. Also, in a preferred embodiment, second cushioning layer 206 could be made of a second type of foam that is different from the first type of foam. Finally, support member 210 could be made of any partially rigid material, including, but not limited to, metal, plastic, carbon fiber, wood, as well as any other material. In a preferred embodiment, support member 210 may be made of a molded plastic.

Generally, the shape of each component of armrest 124 may vary. In the current embodiment, each component has a substantially similar elongated shape. However, in other embodiments, the shape of each component could vary. For example, in an another embodiment, first cushioning layer 204 and second cushioning layer 206 could have shapes that are significantly different from the shape of support member 210.

Preferably, the thicknesses of each component may be tuned to adjust the cushioning and support characteristics for armrest 124. In this embodiment, first cushioning layer 204 has a thickness T2 that is substantially thinner than thickness T3 associated with second cushioning layer 206. Also, support member 210 has a thickness T4 that is approximately similar to thickness T3 of second cushioning layer 206. This arrangement preferably provides for a substantial amount of padding over support member 210 to prevent armrest 124 from feeling too stiff to an occupant. In other embodiments, however, the thicknesses of each of these components could vary. For example, in another embodiment, first cushioning layer 204 could have a thickness that is substantially equal to or greater than thickness T3 of second cushioning later 206 to provide increased padding for armrest 124. In addition, outer cover 202 has a height H1 that is large enough to allow outer cover 202 to wrap around all other components of armrest 124.

Figure 3:
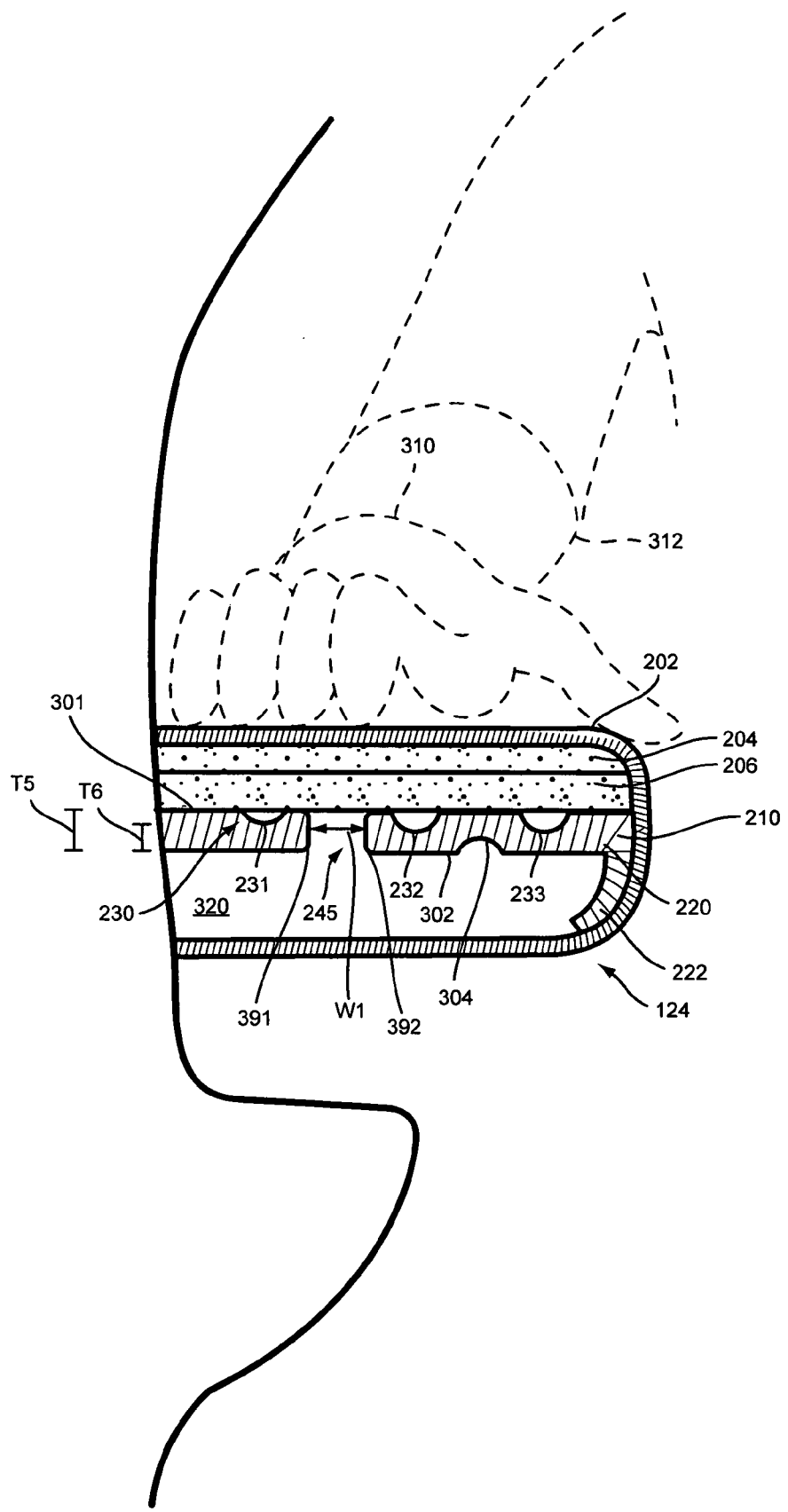
FIG. 3 is a cross sectional view of a preferred embodiment of an armrest.

As seen in FIGS. 2-3, armrest 124 may be assembled by combining outer cover 202, first cushioning layer 204, second cushioning layer 206 and support member 210. In some embodiments, second cushioning layer 206 can be attached directly to support member 210. Following this, first cushioning layer 204 can be attached directly to second cushioning layer 206. Finally, outer cover 202 can be applied over first cushioning layer 204, second cushioning layer 206 and support member 210.

Generally, these components can be attached using any method known in the art. In some cases, first cushioning layer 204, second cushioning layer 206 and support member 210 may be attached to one another using an adhesive of some kind. Also, outer cover 202 could be configured to fit tightly over first cushioning layer 204, second cushioning layer 206 and support member 210. In some cases, outer cover 202 could also be glued or otherwise attached directly to first cushioning layer 204 and portions of support member 210.

Referring to FIG. 3, an assembled cross sectional view of armrest 124, armrest 124 may include interior cavity 320 disposed beneath support member 210. However, in other embodiments, outer cover 202 may be configured to fit against support member 210 so that no interior cavity 320 is formed. Additionally, in still other embodiments, other cushioning material could be used to fill in portions of interior cavity 320.

Preferably, armrest 124 is configured to deflect in a lateral direction when a lateral force is applied, such as during an side impact collision. As previously discussed, outer cover 202, first cushioning layer 204 and second cushioning layer 206 may be made of materials that are generally flexible. Therefore, outer cover 202, first cushioning layer 204 and second cushioning layer 206 may easily deflect in the lateral direction.

In order to provide armrest 124 with significant support for vertical loads, support member 210 is generally constructed of a partially rigid material, such as molded plastic as previously discussed. Preferably, support member 210 is provided with provisions to help weaken support member 210 in a lateral direction. In some embodiments, support member 210 may include provisions that allow for deflection or bending in a lateral direction when a lateral load is applied. In other embodiments, support member 210 may include provisions that allow for permanent deformation in a lateral direction when a lateral load is applied.

In some embodiments, support member 210 may include provisions to reduce the cross section at some portions. By modifying the cross section at some portions of support member 210, support member 210 may be configured to deflect, deform or otherwise break at portions with a reduced cross section as lateral loads are applied. In a preferred embodiment, support member 210 may be configured with a combination of holes, grooves and channels for modifying the cross section of support member 210.

Referring to FIG. 2, support member 210 includes first portion 220. First portion 220 may be a substantially flat support portion that is configured to provide support for vertical loads. In some cases, first portion 220 may be associated with second portion 222. In some cases, second portion 222 may be a sidewall portion that is configured to reinforce first portion 220 at outer periphery 223 of first portion 220. It should be understood that in some embodiments both first portion 220 and second portion 222 may also include provisions that may facilitate connecting armrest 124 to a trim panel or other portion of a door. For clarity, these connecting provisions are not illustrated in the current embodiment.

In some embodiments, first portion 220 may include holes or gaps. In this embodiment, first portion 220 includes set of holes 226. The number of holes comprising set of holes 226 may vary. In some embodiments, set of holes 226 may include a single hole. In other embodiments, set of holes 226 may include two or more holes. In a preferred embodiment, set of holes 226 may include a plurality of holes.

Generally, set of holes 226 may be disposed anywhere within first portion 220. In this preferred embodiment, set of holes 226 may be disposed adjacent to outer periphery 223. As seen in FIG. 2, set of holes 226 may extend from first portion 220 to second portion 222. With this arrangement, set of holes 226 may help reduce the cross section of first portion 220 to help weaken support member 210 in the lateral direction. In particular, set of holes 226 may help facilitate flexing and cracking at outer periphery 223.

In some embodiments, first portion 220 may include a plurality of grooves to help reduce the cross section of support member 210. First portion 220 could include any number of grooves. In some embodiments, first portion 220 could include a single groove. In other embodiments, first portion 220 could include two or more grooves. In a preferred embodiment, first portion 220 may include three grooves.

In the current embodiment, first portion 220 may include plurality of grooves 230, including first groove 231, second groove 232 and third groove 233, disposed on upper surface 301. Generally, plurality of grooves 230 can extend in any direction. For example, grooves can extend in a longitudinal direction, a lateral direction or any direction between a longitudinal direction and a lateral direction. In a preferred embodiment, plurality of grooves 230 may extend in a generally longitudinal direction. In other words, plurality of grooves 230 preferably may extend through a length of support member 210. In this case, plurality of grooves 230 extend through a majority of the length of support member 210.

Referring to FIG. 3, plurality of grooves 230 may reduce the cross section of first portion 220 at first groove 231, second groove 232 and third groove 233. For example, first portion 220 has a thickness T5 over a majority of the width of first portion 220. However, beneath first grooves 231, second groove 232 and third groove 233, the thickness of first portion 220 has been reduced to thickness T6. Therefore, first portion 220 is substantially weaker at portions proximate to first groove 231, second groove 232 and third groove 233, which can help weaken first portion 220 in the lateral direction.

Although the depth of first groove 231, second groove 232 and third groove 233 are substantially similar in the current embodiment, in other embodiments the depths of each groove could be varied. Furthermore, while the cross sectional shapes of first groove 231, second groove 232 and third groove 233 are substantially similar, in other embodiments the cross sections could also vary. By changing the depths of each groove and varying the cross section, the deformation characteristics of first portion 220 can be tuned.

In some embodiments, grooves could also be applied to lower surface 302 of first portion 220. In the current embodiment, lower surface 302 also includes fourth groove 304. In other embodiments, more than one lower groove could be used. In still other embodiments, no lower grooves may be used. By using a combination of grooves on upper surface 301 as well as lower surface 302 of first portion 220, the deformation properties of support member 210 can be further modified.

In some embodiments, first portion 220 may include other provisions to weaken support member 210 in a lateral direction. For example, first portion 220 may also include one or more channels. In some cases, channels may be substantially wider than grooves. Furthermore, whereas grooves may not penetrate completely through first portion 220, channels may penetrate through first portion 220 so that each channel is open on lower surface 302 and upper surface 301 of first portion 220. In other embodiments, however, channels and grooves could have substantially similar widths, depths and or other features.

Referring to FIG. 2, first portion 220 preferably includes plurality of channels 240. In this case, plurality of channels 240 comprises first channel 241, second channel 242, third channel 243, fourth channel 244 and fifth channel 245. Generally, plurality of channels 240 can extend in any direction. For example, plurality of channels 240 could extend in a longitudinal direction, a lateral direction as well as any direction in between the longitudinal and lateral directions. In a preferred embodiment, plurality of channels 240 extend in a direction different from the longitudinal direction. In particular, plurality of channels 240 may be disposed generally diagonally across first portion 220.

Preferably, each channel can provide gaps in the cross section of support member 210. For example, fifth channel 245 can be seen in cross section in FIG. 3, appearing as a wide gap separating first side wall 391 and second side wall 392 of first portion 220 by a width W1. Preferably, each of the remaining channels provide gaps through different portions of support member 210, thereby reducing the lateral strength.

Generally, the width of each channel can be varied. By varying the widths of the channels, the overall lateral strength of support member 210 can be varied. In some embodiments, the widths of each channel could have a value in the range between 0.01 and 5 mm. In other embodiments, the widths of each channel could have a value in the range between 0.5 mm and 4 mm. In a preferred embodiment, each channel comprising plurality of channels 240 may have a value of approximately 3 mm.

In some embodiments, channels and grooves can intersect. In other embodiments, channels and grooves may not intersect. In still other embodiments, some channels may intersect with some grooves. In this preferred embodiment, first channel 241, second channel 242, third channel 243, fourth channel 244 and fifth channel 245 each intersect with one or more grooves from plurality of grooves 230. Furthermore, each channel generally intersects a groove in a non-perpendicular manner. For example, first channel 241 is configured to intersect third groove 233 at an angle A. In this embodiment, angle A is an acute angle that is not a right angle. Preferably, the second channel 242, third channel 243, fourth channel 244 and fifth channel 245 are also configured to intersect one or more grooves at an acute angle.

Plurality of channels 240 may be disposed in an alternating configuration. For example, first channel 241, second channel 242 and third channel 243 may form first set of channels 261 that extend from first side 250 of first portion 220 towards central portion 252 of first portion 220. Likewise, fourth channel 244 and fifth channel 245 may form second set of channels 262 that extend from second side 254 of first portion 220 towards central portion 252. Preferably, first set of channels 261 and second set of channels 262 are interdigitated. With this interdigitated configuration, plurality of channels 240 can facilitate shearing during lateral loading to provide a more compact collapse of armrest 124 and help with shock absorption. Details of this shearing are discussed in detail below.

In some embodiments, using alternating channels can also help with material flow during molding. In cases where a support member is made with a molding process, reduced cross sections from channels can reduce material flow into the mold. Providing alternating channels can create a path for the molding material that can increase the flow. It should be understood, however, that this invention is not limited to support members made using such molding techniques.

In some embodiments, channels could also begin or end at grooves and/or holes. For example, first channel 241 preferably has first end 271 that is open to first hole 281. Also, third channel 243 has first end 272 that is open to second hole 282. Additionally, fourth channel 244 has first end 273 that is open to first groove 231. Likewise, fifth channel 245 has first end 274 that is open to first groove 231. This preferred arrangement may also help with shearing during lateral impacts.

In some embodiments, second portion 222 may also be associated with grooves. In this embodiment, second portion 222 includes first sidewall groove 291 and second sidewall groove 292. Preferably, using grooves with second portion 222 may help decrease the lateral strength of second portion 222 while maintaining vertical strength.

In some embodiments, sidewall grooves in second portion 222 can be aligned with channels or holes in first portion 220. In this embodiment, first sidewall groove 291 is preferably aligned with second channel 242. Likewise, second sidewall groove 292 is preferably aligned with second hole 282 and third channel 243. With this arrangement, the lateral cross section of support member 210 can be greatly reduced in some regions.

By using both channels and grooves, support member 210 may be significantly weakened in a lateral direction under an applied lateral force. In some cases, reducing the cross section in some places using grooves and creating gaps in the cross section using channels can provide weakened portions that are configured for deformation during an impact.

Referring to FIG. 3, as hand 310 and arm 312 are laid on armrest 124 they apply a vertical load to armrest 124. At this point, support member 210 preferably provides sufficient vertical strength to armrest 124. Furthermore, first cushioning layer 204, second cushioning layer 206 and outer covering 202 preferably help provide a comfortable surface for hand 310 and arm 312.

Figure 4:
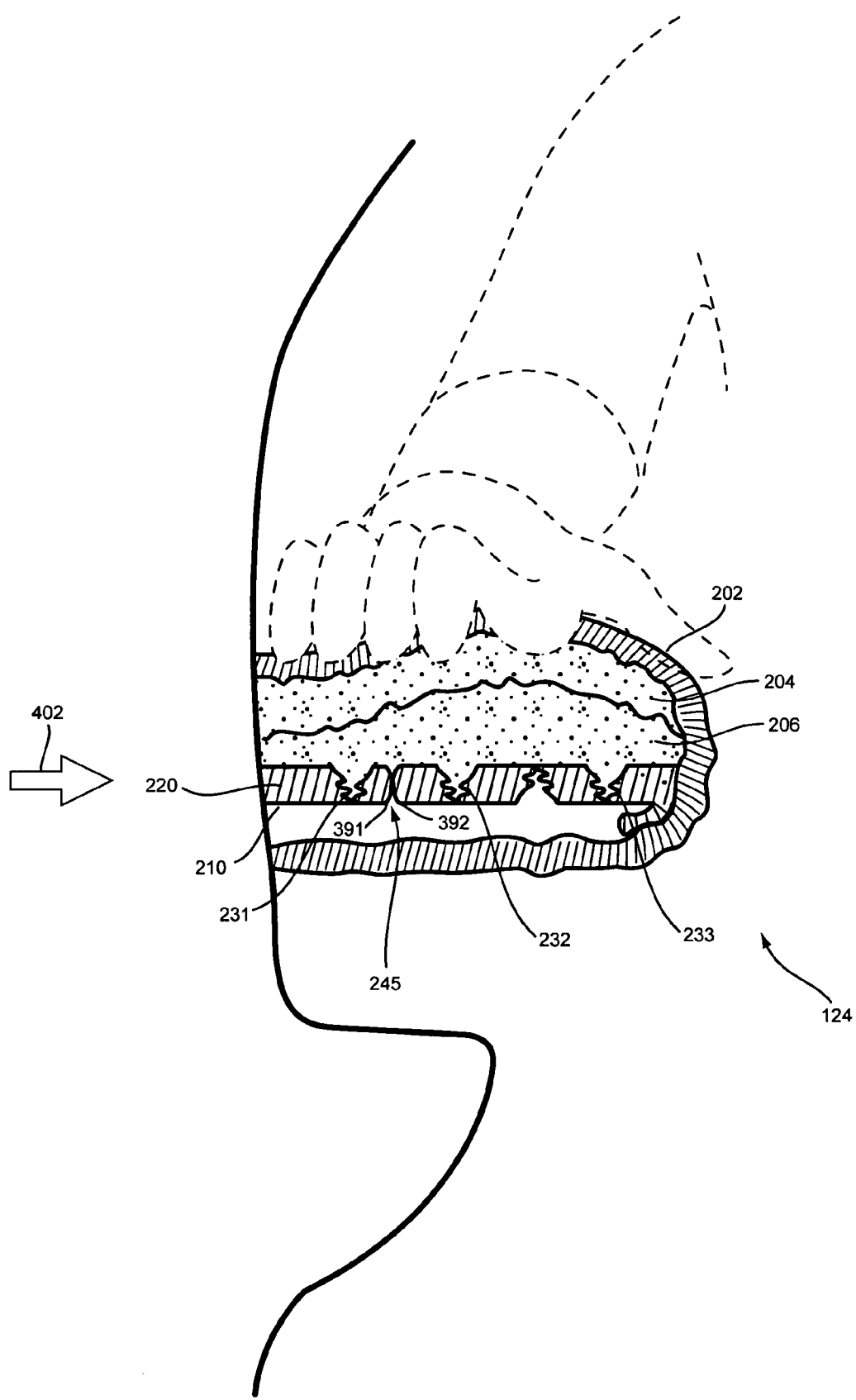
FIG. 4 is a cross sectional view of a preferred embodiment of an armrest following a lateral impact.

Referring to FIG. 4, armrest 124 may deform when a lateral force is applied. In some cases, an outer shell of a door or other portion of a motor vehicle could apply this lateral force during a side impact collision. As previously discussed, armrest 124 is preferably configured to deflect, deform or otherwise collapse during lateral loading to help facilitate shock absorption and reduce any tendency for injury to an occupant.

Referring to FIG. 4, as lateral force 402 is applied to armrest 124, outer cover 202, first cushioning layer 204 and second cushioning layer 206 may deflect in a lateral direction. In some cases, an excess of material may create a bulge of these various layers. Furthermore, first portion 220 of support member 210 has partially collapsed in the lateral direction, as first side wall 391 and second side wall 392 of fifth channel 245 have collapsed against one another. Additionally, first portion 220 has ruptured in regions proximate to first groove 231, second groove 232 and third groove 233 as a result of reduced cross sections in these regions.

Figure 5:
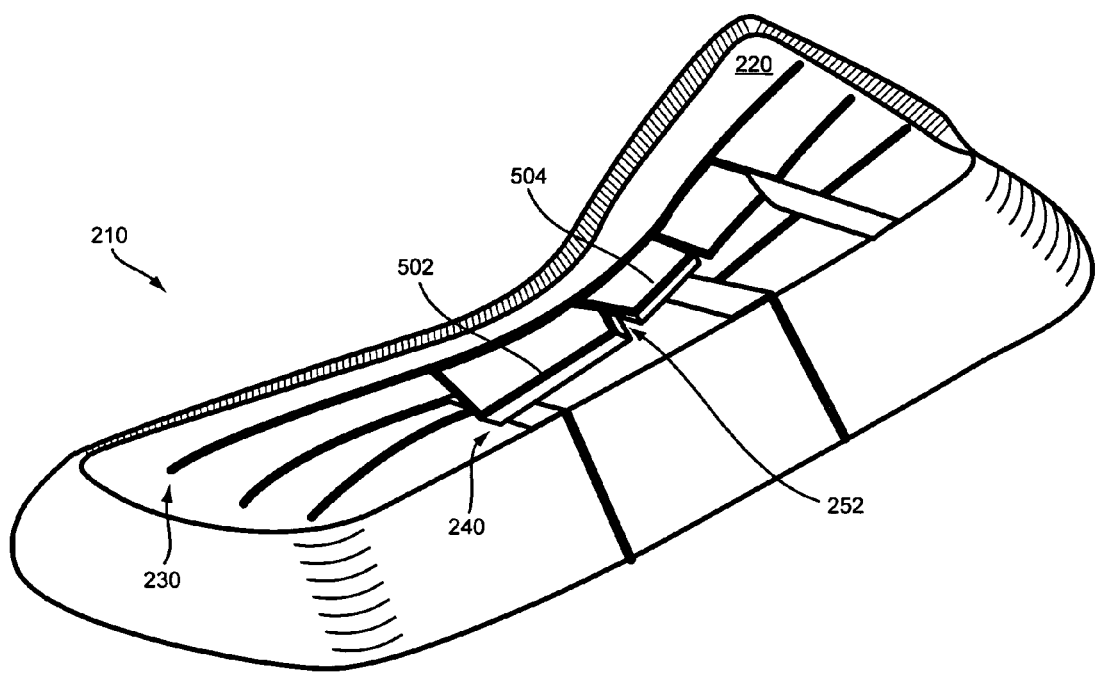
FIG. 5 is an isometric view of a preferred embodiment of a support member following a lateral impact.

FIG. 5 is an enlarged view of a preferred embodiment of support member 210 following the application of lateral force 402 as seen in FIG. 4. Some shearing of support member 210 may occur due to the intersection of plurality of grooves 230 and plurality of channels 240. In this embodiment, lateral forces have caused first sheared portion 502 and second sheared portion 504 to overlap on top of central portion 252. This stacking of first sheared portion 502 and second sheared portion 504 may help facilitate lateral contraction as some material slides over top of adjacent material. This lateral shearing can also help prevent upward bulging of first portion 220 during lateral deformation. In some cases, this arrangement may decrease the tendency of pieces of first portion 220 from being exposed and contacting a vehicle occupant.

A support member may include other provisions for providing increased vertical support and decreased lateral strength. In some embodiments, a support member can include one or more ribs that may project away from a substantially flat support portion of the support member. In some cases, the one or more ribs could extend below the substantially flat support member. In other cases, the one or more ribs could extend above the substantially flat support member. This ribbed configuration may generally provide increased strength for vertical loading and also provide increased deflection or deformation in a lateral direction under lateral loads.

Figure 6:
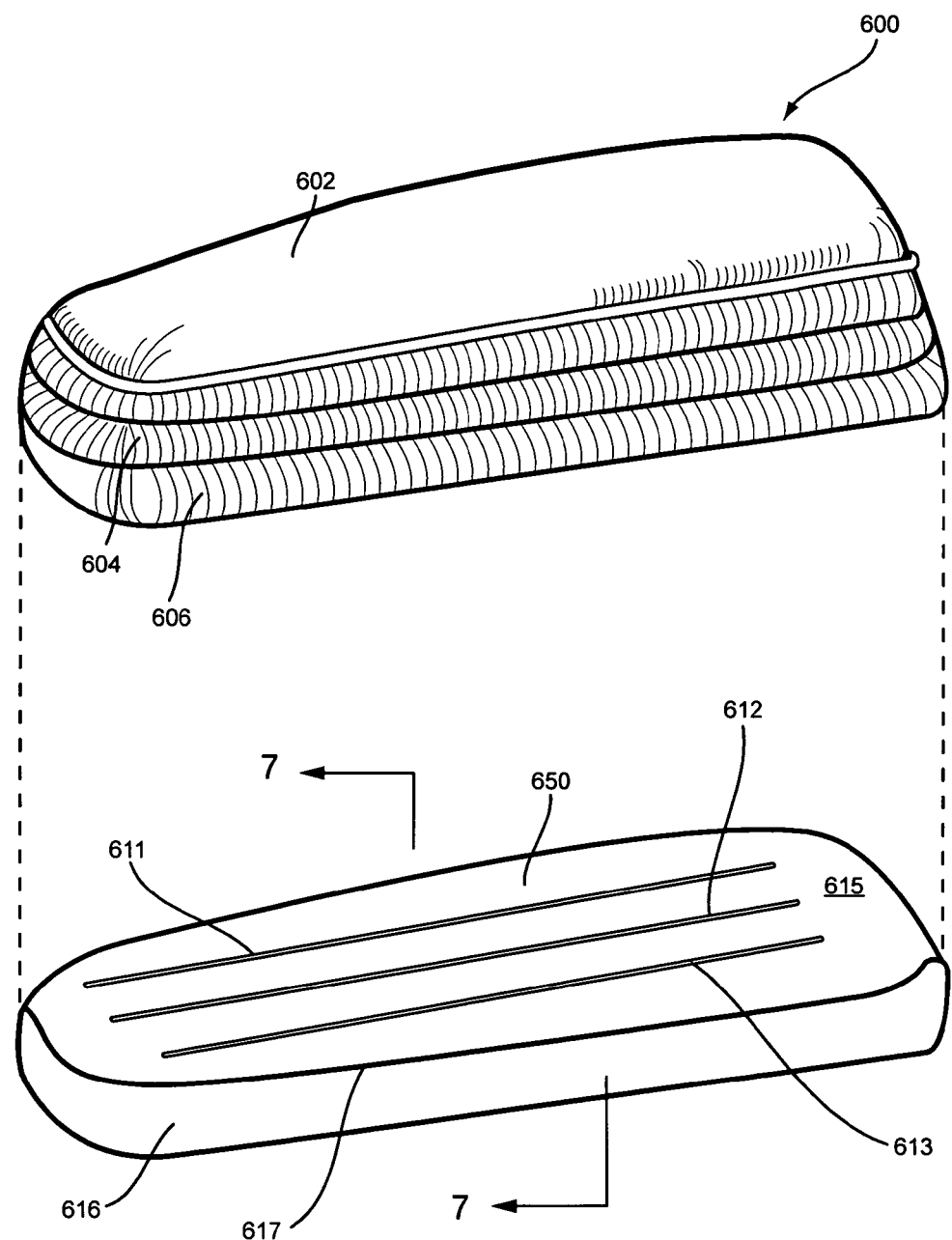
FIG. 6 is an exploded isometric view of an alternative embodiment of an armrest.
Figure 7:
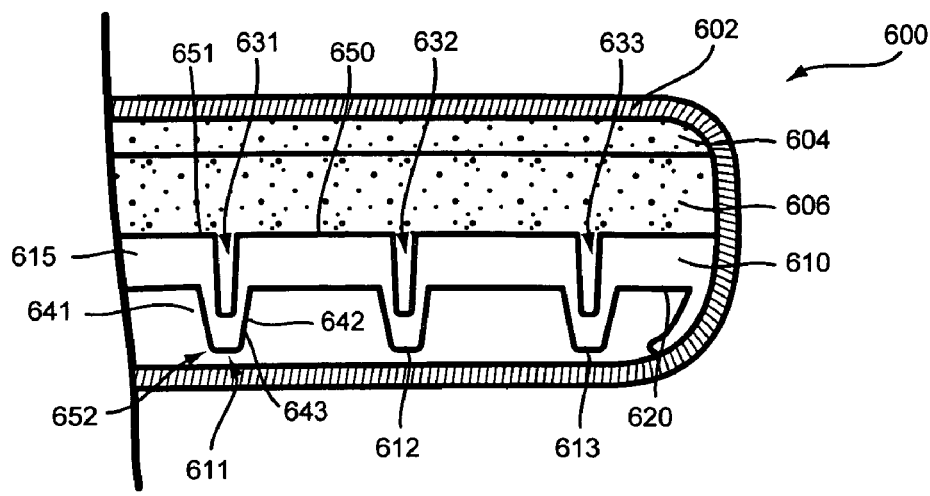
FIG. 7 is a cross sectional view of an alternative embodiment of an armrest.

FIGS. 6-15 illustrate alternative embodiments of a support member provided with one or more ribs. Referring to FIGS. 6-7, armrest 600 may be provided with outer cover 602, first cushioning layer 604 and second cushioning layer 606. Preferably, each of these components can be similar to outer cover 202, first cushioning layer 204 and second cushioning layer 206 that have been discussed in the previous embodiment. Armrest 600 preferably also includes support member 610. Preferably, support member 610 is provided with a similar shape, size and materials as those discussed for support member 210 of the previous embodiment.

Support member 610 preferably includes substantially flat support portion 615. Referring to FIG. 6, support member 610 may also be provided with side wall portion 616 that connects to substantially flat support portion 615 at outer periphery 617. In some embodiments, support member 610 may also be provided with one or more ribs. In this embodiment, support member 610 may include first rib 611, second rib 612 and third rib 613. Generally, each rib may extend in any direction. For example, each rib could extend in a longitudinal direction, a lateral direction or any direction in between. In this preferred embodiment, first rib 611, second rib 612 and third rib 613 may extend in a generally longitudinal direction.

Referring to FIG. 7, first rib 611, second rib 612 and third rib 613 may each project below lower surface 620 of substantially flat support portion 615. In the current embodiment, first rib 611, second rib 612 and third rib 613 each project a substantially similar distance from lower surface 620, however in other embodiments the distance each rib projects could vary.

In some embodiments, ribs may be associated with hollow cavities. In this embodiment, first rib 611, second rib 612 and third rib 613 are associated with first hollow cavity 631, second hollow cavity 632 and third hollow cavity 633, respectively. In some cases, first hollow cavity 631, second hollow cavity 632 and third hollow cavity 633 may extend through substantially the entire length of first rib 611, second rib 612 and third rib 613, respectively. However, in other cases, each cavity may extend through only a portion of the associated rib.

As seen in FIG. 7, first hollow cavity 631, second hollow cavity 632 and third hollow cavity 633 may be open at upper surface 650 of substantially flat support portion 615. In particular, first end portion 651 of first rib 611 may be open at upper surface 650. Preferably, the first end portions of the remaining ribs are also open at upper surface 650.

Preferably, first hollow cavity 631, second hollow cavity 632 and third hollow cavity 633 are closed at lower surface 620 of substantially flat support portion 615. First rib 611 may include first leg portion 641 and second leg portion 642 that extend below lower surface 620. Additionally, first rib 611 includes intermediate portion 643 that is disposed between first leg portion 641 and second leg portion 642. This configuration preferably provides a closed configuration for first rib 611 at second end portion 652 of first rib 611. Preferably, each of the remaining ribs have second end portions that are also closed in a substantially similar way below lower surface 620.

Figure 8:
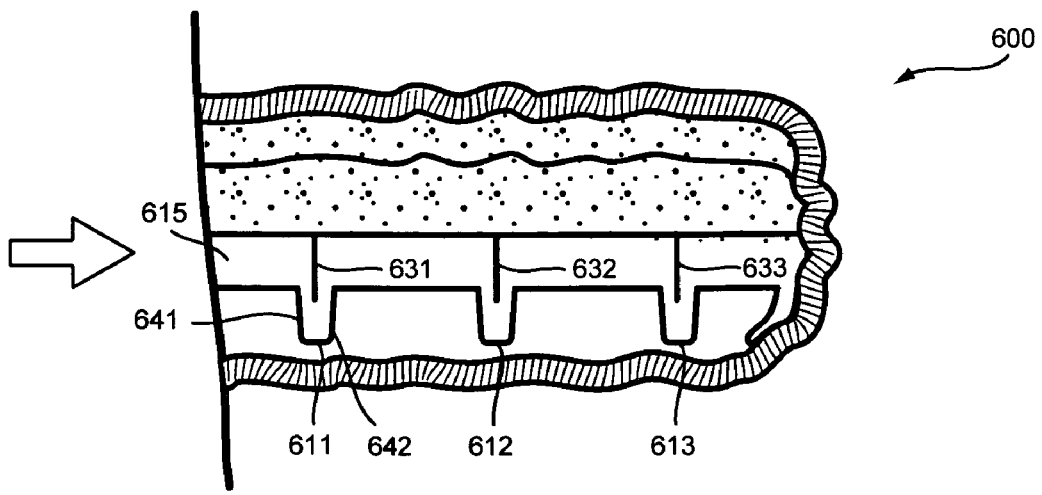
FIG. 8 is a cross sectional view of an alternative embodiment of an armrest following a lateral impact.

Referring to FIGS. 7 and 8, first rib 611, second rib 612 and third rib 613 may be configured to pinch closed when a lateral force is applied to armrest 600. As seen in FIG. 7, first leg portion 641 and second leg portion 642 of first rib 611 are spaced apart from one another during normal use. However, as a lateral force is applied, forces are distributed through substantially flat support portion 615 in a manner that causes first rib 611 to close. As seen in FIG. 8, as a lateral force is applied, first hollow cavity 631 collapses and first leg portion 641 collides with second leg portion 642. Preferably, second rib 612 and third rib 613 are configured to pinch closed in a similar manner to first rib 611. This pinching of first rib 611, second rib 612 and third rib 613 allows for some shock absorption as well as a controlled reduction in the lateral width of armrest 600.

Figure 9:
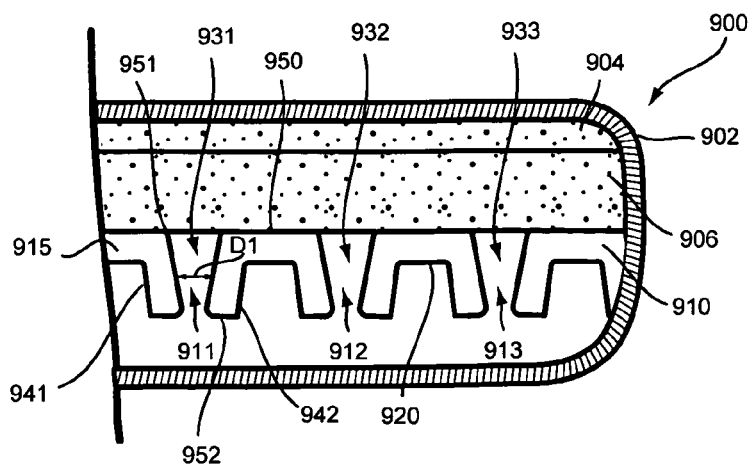
FIG. 9 is a cross sectional view of an alternative embodiment of an armrest.
Figure 10:
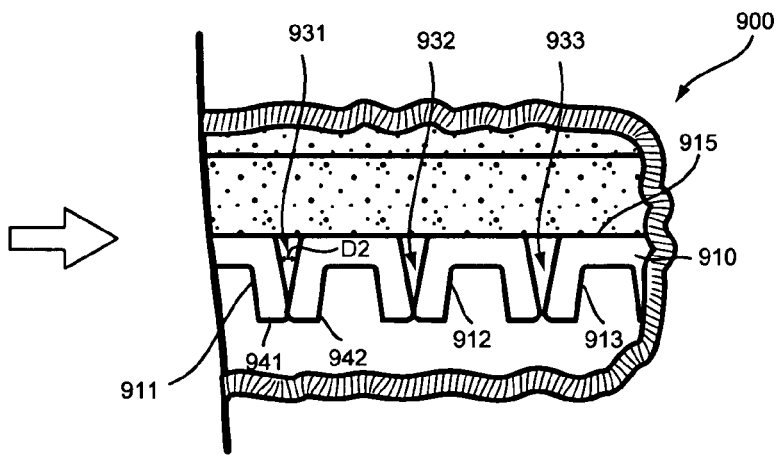
FIG. 10 is a cross sectional view of an alternative embodiment of an armrest following a lateral impact.
Figure 11:
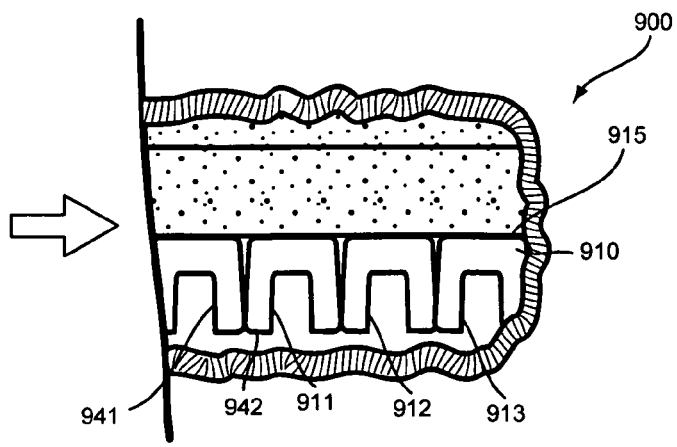
FIG. 11 is a cross sectional view of an alternative embodiment of an armrest following a lateral impact.

FIGS. 9 through 11 refer to an alternative embodiment of a deforming armrest. Referring to FIG. 9, armrest 900 includes substantially similar components to the previous embodiments. For example, armrest 900 includes outer cover 902, first cushioning layer 904 and second cushioning layer 906. Armrest 900 also includes support member 910.

Support member 910 preferably includes substantially flat support portion 915. In some embodiments, support member 910 may also include first rib 911, second rib 912 and third rib 913. Generally, first rib 911, second rib 912 and third rib 913 may be substantially similar to the ribs of the previous embodiment. In particular, first rib 911, second rib 912 and third rib 913 may extend in a generally longitudinal direction. Also, first rib 911, second rib 912 and third rib 913 preferably include first hollow cavity 931, second hollow cavity 932 and third hollow cavity 933, respectively.

As seen in FIG. 9, first hollow cavity 931, second hollow cavity 932 and third hollow cavity 933 may be open at upper surface 950 of substantially flat support portion 915. In particular, first end portion 951 of first rib 911 may be open at upper surface 950. Preferably, the first end portions of second rib 912 and third rib 913 are also open at upper surface 950.

Preferably, first hollow cavity 931, second hollow cavity 932 and third hollow cavity 933 are also open at lower surface 920 of substantially flat support portion 915. First rib 911 may include first leg portion 941 and second leg portion 942 that extend below lower surface 920. In a preferred embodiment, first leg portion 941 and second leg portion 942 are spaced apart at second end portion 952 of first rib 911 disposed opposite of first end portion 951. In some embodiments, second rib 912 and third rib 913 have second end portions that are also open in a substantially similar way below lower surface 920.

Referring to FIGS. 9 and 10, first rib 911, second rib 912 and third rib 913 may be configured to partially pinch closed when a lateral force is applied to armrest 900. As seen in FIG. 9, first leg portion 941 and second leg portion 942 are spaced apart from one another an average distance D1 during normal use. However, as a lateral force is applied, forces are distributed through substantially flat support portion 915 in a manner that causes first rib 911 to partially close. As seen in FIG. 10, as a lateral force is applied, first hollow cavity 931 collapses and first leg portion 941 partially collides with second leg portion 942. In this case, first leg portion 941 and second leg portion 942 are spaced apart by an average distance D2. Preferably, second rib 912 and third rib 913 are configured to partially collapse in a similar manner to first rib 911. This partial collapse of first rib 911, second rib 912 and third rib 913 allows for some shock absorption as well as a controlled reduction in the lateral width of armrest 900.

FIG. 11 illustrates an alternative embodiment in which first rib 911, second rib 912 and third rib 913 fully collapse under lateral forces. In particular, first leg portion 941 and second leg portion 942 of first rib 911 are configured to contact when lateral loads are applied. By adjusting the distances between first leg portion 941 and second leg portion 942 in a post-loaded condition, the types of shock absorption and deflection of first rib 911 can be fine tuned. Preferably, the deformation of second rib 912 and third rib 913 can also be tuned between partial collapse and full collapse, thereby facilitating increased control of shock absorption and deflection of support member 910.

In some embodiments, adjacent ribs could also be configured to contact one another. For example, in an alternative embodiment, the spacing between adjacent ribs could be small enough to allow a first leg portion from a first rib to contact a second leg portion from a second rib. In another embodiment, the length of leg portions could be longer so that each leg portion could bend and be configured to contact a leg portion of an adjacent rib.

Figure 16:
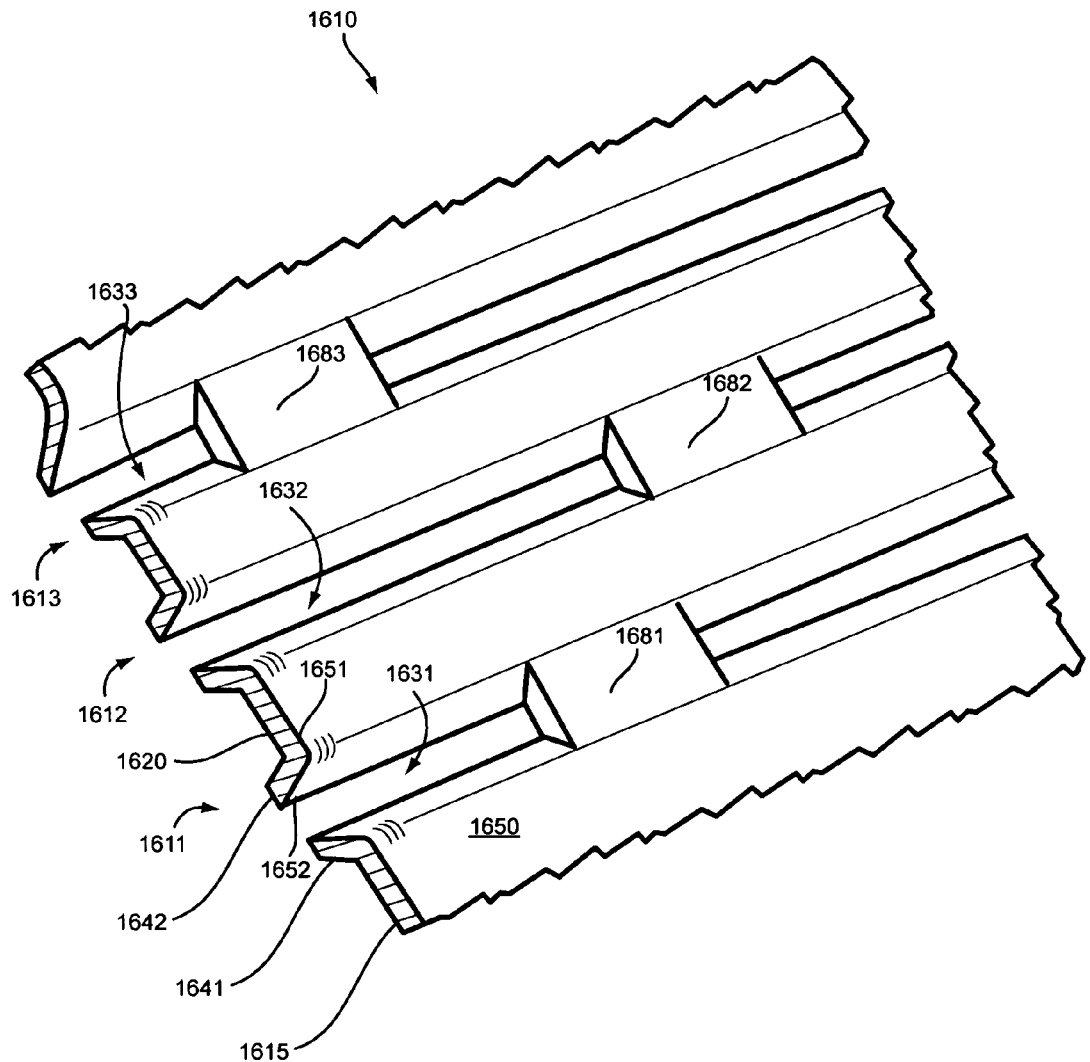
FIG. 16 is an isometric view of an alternative embodiment of a portion of a support member.

Referring to FIG. 16, in still other embodiments, cross-ribs could be added to a support member. In some cases, the cross-ribs may be staggered to help control sideways push strength and crush. In this alternative embodiment, support member 1610 includes substantially flat support portion 1615. In some embodiments, support member 1610 may also include first rib 1611, second rib 1612 and third rib 1613. Generally, first rib 1611, second rib 1612 and third rib 1613 may be substantially similar to the ribs of the previous embodiment. In particular, first rib 1611, second rib 1612 and third rib 1613 may extend in a generally longitudinal direction. Also, first rib 1611, second rib 1612 and third rib 1613 preferably include first hollow cavity 1631, second hollow cavity 1632 and third hollow cavity 1633, respectively.

As seen in FIG. 16, first hollow cavity 1631, second hollow cavity 1632 and third hollow cavity 1633 may be open at upper surface 1650 of substantially flat support portion 1615. In particular, first end portion 1651 of first rib 1611 may be open at upper surface 1650. Preferably, the first end portions of second rib 1612 and third rib 1613 are also open at upper surface 1650.

Preferably, first hollow cavity 1631, second hollow cavity 1632 and third hollow cavity 1633 are also open at lower surface 1620 of substantially flat support portion 1615. First rib 1611 may include first leg portion 1641 and second leg portion 1642 that extend below lower surface 1620. In a preferred embodiment, first leg portion 1641 and second leg portion 1642 are spaced apart at second end portion 1652 of first rib 1611 disposed opposite of first end portion 1651. In some embodiments, second rib 1612 and third rib 1613 have second end portions that are also open in a substantially similar way below lower surface 1620.

Support member 1610 preferably also includes one or more cross-ribs. In this embodiment, support member 1610 may include first cross-rib 1681, second cross-rib 1682 and third cross-rib 1683. Generally, first cross-rib 1681, second cross-rib 1682 and third cross-rib 1683 are configured to extend in a generally lateral direction. For example, first cross-rib 1681 is configured to extend from first leg portion 1641 to second leg portion 1642. Likewise, second cross-rib 1682 and third cross-rib 1683 may extend across the leg portions of second rib 1612 and third rib 1613, respectively. As previously discussed, first cross-rib 1681, second cross-rib 1682 and third cross-rib 1683 may be staggered. With this arrangement, the lateral deformation of support member 1610 can be tuned.

Although the current embodiment includes three cross-ribs, in other embodiments, any number of cross-ribs may be used. Furthermore, while the current embodiment uses staggered cross-ribs, in other embodiments cross-ribs may be configured to extend over the entire lateral width of a support member. Also, cross-ribs can be used with any type of grooves discussed in this detailed description. In particular, the use of cross-ribs is not limited to grooves that are open on an upper and lower surface.

Figure 12:
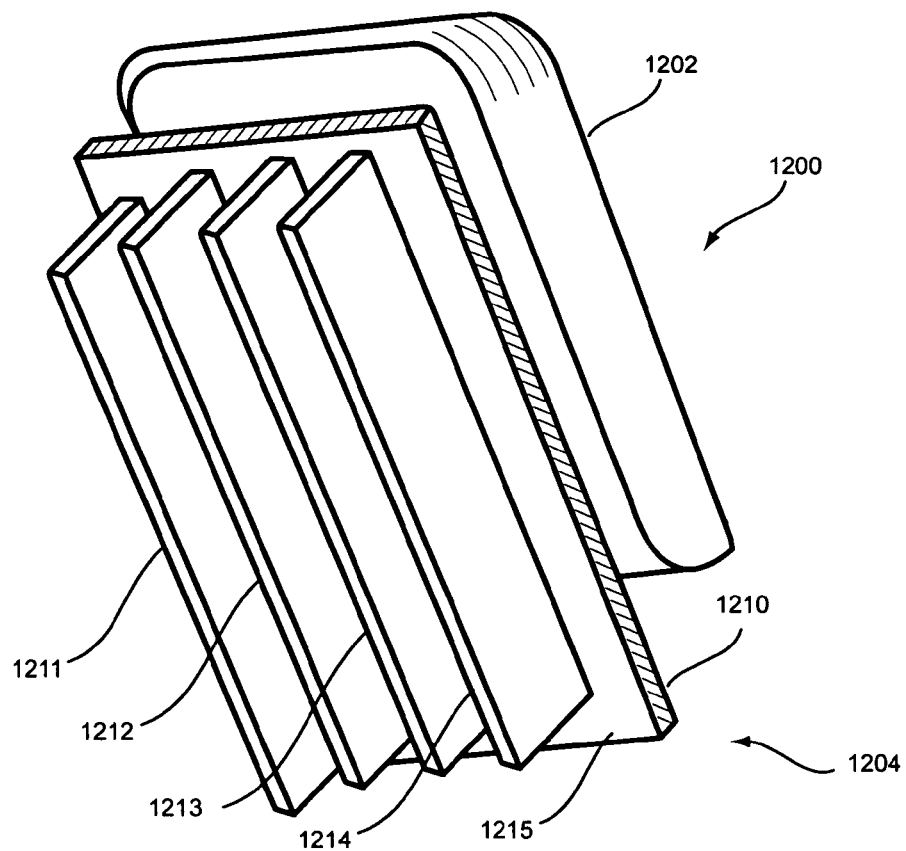
FIG. 12 is an exploded isometric view of an alternative embodiment of an armrest.
Figure 13:
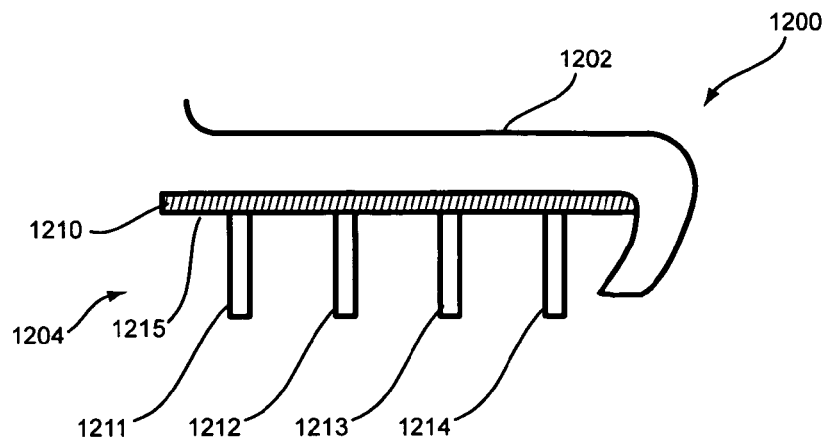
FIG. 13 is a cross sectional view of an alternative embodiment of an armrest.

FIGS. 12-15 illustrate an alternative embodiment of a deforming armrest. Referring to FIGS. 12-13, armrest 1200 includes covering portion 1202 and support member 1204. Although armrest 1200 includes a single covering portion 1202 in the current embodiment, in other embodiments covering portion 1202 could be associated with multiple layers, including one or more cushioning layers. In the current embodiment, covering portion 1202 preferably serves as a cushioning layer and provides a continuous outer surface for armrest 1200.

Support member 1204 preferably includes substantially flat support portion 1210. In some embodiments, support member 1204 may also include one or more ribs. In this preferred embodiment, support member 1204 includes first rib 1211, second rib 1212, third rib 1213 and fourth rib 1214. Generally, ribs may extend in any direction. For example, ribs could extend in a longitudinal direction, a lateral direction or any direction in between. In this preferred embodiment, first rib 1211, second rib 1212, third rib 1213 and fourth rib 1214 may extend in a generally longitudinal direction.

First rib 1211, second rib 1212, third rib 1213 and fourth rib 1214 may preferably project above substantially flat support portion 1210. Generally, the properties of first rib 1211, second rib 1212, third rib 1213 and forth rib 1214 could vary. In some embodiments, the height of each rib could vary. In other embodiments, the spacing between adjacent ribs could vary. Additionally, in still other embodiments the thickness of each rib could vary.

Furthermore, the various properties discussed for ribs in the previous embodiments could be applied to first rib 1211, second rib 1212, third rib 1213 and fourth rib 1214. For example, in some embodiments, first rib 1211, second rib 1212, third rib 1213 and fourth rib 1214 could each include a hollow cavity. Also, first rib 1211, second rib 1212, third rib 1213 and fourth rib 1214 could include one or more leg portions that surround a hollow cavity. In such embodiments, first rib 1211, second rib 1212, third rib 1213 and fourth rib 1214 could be configured to collapse in a lateral direction under lateral forces.

In some embodiments, first rib 1211, second rib 1212, third rib 1213 and fourth rib 1214 may be attached to substantially flat support portion 1210 using glue or another type of adhesive. In a preferred embodiment, first rib 1211, second rib 1212, third rib 1213 and fourth rib 1214 may be integrally formed with outer surface 1215 of substantially flat support portion 1210. This integral configuration may help provide additional vertical strength.

Figure 14:
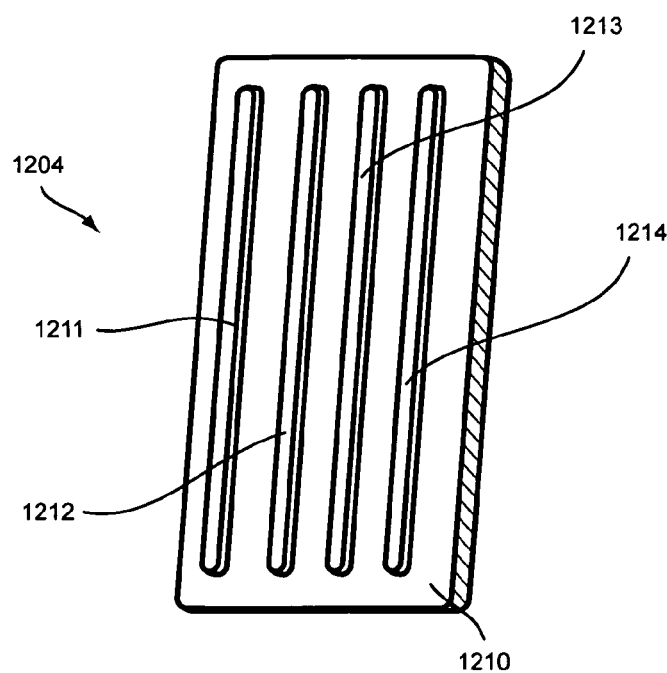
FIG. 14 is a schematic isometric view of an alternative embodiment of a support member.
Figure 15:
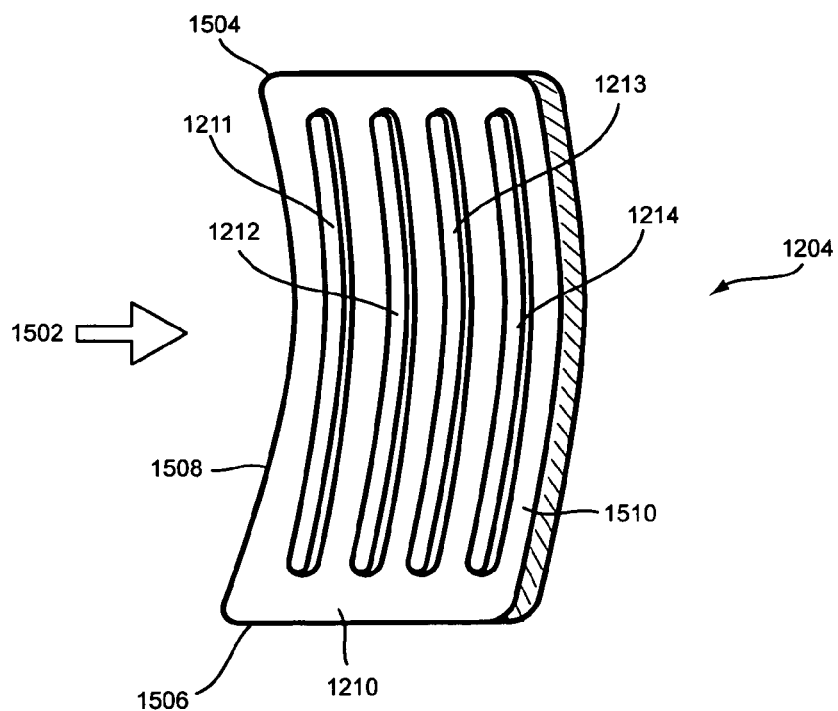
FIG. 15 is a schematic isometric view of an alternative embodiment of a support member during a lateral impact.

FIGS. 14 and 15 illustrate an isometric view of the deformation of support member 1204. For purposes of clarity, covering portion 1202 is not shown, however it should be understood that covering portion 1202 can be configured to deform in a lateral direction with support member 1204.

Initially, as seen in FIG. 14, substantially flat support portion 1210 has a generally rectangular shape. Also, first rib 1211, second rib 1212, third rib 1213 and fourth rib 1214 are all generally straight. Referring to FIG. 15, as lateral force 1502 is applied, support member 1204 may bend in a lateral direction. In particular, first end 1504 and second end 1506 of substantially flat support portion 1210 may remain generally fixed in place. However, under the lateral force, first lateral side 1508 and second lateral side 1510 may undergo inward bending. Furthermore, first rib 1211, second rib 1212, third rib 1213 and fourth rib 1214 may also bend inwardly. This inward bending preferably helps to absorb force applied by lateral force 1502. In some cases, under excessive lateral forces, support member 1204 could continue bending until it breaks. In other cases, support member 1204 could permanently deform without breaking.

Generally, a deforming armrest may be disposed on any portion of a motor vehicle to protect vehicle occupants during a front end, rear end or side collision. The embodiments discussed in this detailed description associate a deforming armrest with a door of a motor vehicle, including both front doors and rear doors of a vehicle. In other embodiments, however, a deforming armrest may be disposed within or near other portions of a motor vehicle associated with a vehicle occupant. Generally, a deforming armrest may be attached to any fixed portion of a motor vehicle, including trim or other fixed portions. For example, a deforming armrest could be attached directly to a seat in some embodiments. In another embodiment, a deforming armrest could be associated with a trim panel adjacent to a rear seat in a two door vehicle.

Through the use of the disclosed deforming armrest arrangement, occupant injury can be reduced by providing an additional energy absorbing stroke.

While various embodiments of the invention have been described, the description is intended to be exemplary, rather than limiting and it will be apparent to those of ordinary skill in the art that many more embodiments and implementations are possible that are within the scope of the invention.

Accordingly, the invention is not to be restricted except in light of the attached claims and their equivalents. Also, various modifications and changes may be made within the scope of the attached claims.

What is claimed is:

1. An armrest for a motor vehicle, comprising:
   a support member attached to a fixed portion of the motor vehicle and configured to provide vertical support for the armrest under a vertical load applied by an arm of an occupant;
   the support member including
      a substantially flat support portion having a first surface and a second surface opposite to the first surface, and
      a rib having a first end portion and a second end portion, the second end portion of the rib projecting away from the second surface of the substantially flat support portion;
   the rib extending in a direction that is generally perpendicular to a lateral direction, the lateral direction being a direction between an occupant and the fixed portion of the motor vehicle; and
   wherein the rib is configured to substantially reinforce the support member in a vertical direction and wherein the rib is configured to provide lateral deformation when a lateral load is applied to the armrest,
   wherein the second end portion of the rib is disposed on a side of the second surface of the substantially flat support portion opposite to the first surface,
   wherein the rib includes a hollow cavity that extends through a substantial majority of the rib in the direction perpendicular to the lateral direction, and
   wherein the hollow cavity is open at the first end portion of the rib, is closed at the second end portion of the rib, and extends beyond the second surface of the substantially flat support portion into the second end portion of the rib.

2. The armrest according to claim 1, further comprising a first cross-rib configured to extend in a lateral direction.

3. The armrest according to claim 2, further comprising a second cross-rib in a staggered arrangement with the first cross-rib.

4. The armrest according to claim 1, wherein the second end portion of the rib includes a first leg portion and a second leg portion, wherein the first leg portion and the second leg portion are spaced apart at the second end portion of the rib, and wherein the first leg portion and the second leg portion are connected by an intermediate portion.

5. The armrest according to claim 4, wherein the first leg portion and the second leg portion project away from the second surface of the substantially flat support portion and toward each other.

6. The armrest according to claim 4, wherein the hollow cavity is wider at the first end portion than at the second end portion.

7. The armrest according to claim 4, wherein the first leg portion and the second leg portion are configured to contact one another when a lateral force is applied to the armrest.

8. The armrest according to claim 1, wherein the rib comprises a first rib, and wherein the support member includes a second rib having a construction substantially similar to the first rib, and wherein the first rib and the second rib are configured to contact one another when a lateral force is applied.

9. The armrest according to claim 1, wherein the first leg portion and the second leg portion are configured to contact one another at the second end portion of the rib, when a lateral force is applied to the armrest, such that opposing faces of the first leg portion and the second leg portion are in contact.

10. The armrest according to claim 2, wherein the first cross-rib has a first open edge at the first surface of the substantially flat support portion and a second open edge at the first surface of the substantially flat support portion, and
   wherein the first open edge and the second open edge are substantially parallel to the lateral direction.

11. The armrest according to claim 10, wherein an open side face of the first cross-rib between the first open edge and an inside edge of the hollow cavity at the second end portion of the rib, is shaped as an isosceles trapezoid.

12. The armrest according to claim 3, further comprising a third cross-rib in a staggered arrangement with the first cross-rib and the second cross-rib,
   wherein, in the direction perpendicular to the lateral direction, a center of the third cross-rib is positioned between a center of the first cross-rib and a center of the second cross-rib.

13. The armrest according to claim 1, wherein the rib comprises a first rib, and wherein the support member includes a second rib having a construction substantially similar to the first rib, and wherein the first rib and the second rib extend substantially parallel to each other in the direction generally perpendicular to the lateral direction.

14. The armrest according to claim 1, wherein the substantially flat support portion defines a plurality of channels extending in a direction different from the direction perpendicular to the lateral direction.

15. The armrest according to claim 1, wherein the rib comprises a first rib, and wherein the support member includes a plurality of ribs having a construction substantially similar to the first rib, and wherein each of the plurality of ribs extends in the direction generally perpendicular to the lateral direction,
   wherein the substantially flat support portion defines a plurality of channels extending in a direction different from the direction perpendicular to the lateral direction,
   wherein at least two channels of the plurality of channels each intersect at least two ribs of the plurality of ribs, and
   wherein the plurality of channels has an alternating configuration.

16. The armrest according to claim 15, wherein the plurality of channels includes a first set of channels extending from a first side of the support member and wherein the plurality of channels includes a second set of channels extending from a second side of the support member.

17. The armrest according to claim 16, wherein the first set of channels is interdigitated with the second set of channels.

18. The armrest according to claim 15, wherein longitudinal axes of the at least two channels intersect corresponding longitudinal axes of the at least two ribs at an angle that is not a right angle.

19. The armrest according to claim 1, wherein the rib comprises a first rib, and wherein the support member includes a plurality of ribs having a construction substantially similar to the first rib, and wherein each of the plurality of ribs extends in the direction generally perpendicular to the lateral direction,
   wherein the substantially flat support portion defines a plurality of channels extending in a direction different from the direction perpendicular to the lateral direction,
   wherein the plurality of channels is configured to intersect with the plurality of ribs, and
   wherein at least one of the channels intersects at least two ribs such that it extends out from both sides of the at least two ribs.

20. The armrest according to claim 19, wherein an angle formed between a longitudinal axis of a first channel and a longitudinal axis of a first rib is an acute angle.

21. The armrest according to claim 19, wherein the ribs extend through a majority of a length of the support member.

22. The armrest according to claim 19, wherein the substantially flat support portion defines a plurality of holes disposed on an outer periphery of the support member, and wherein a channel has an end open to a portion of a hole of the plurality of holes.

23. The armrest according claim 1, wherein the substantially flat support portion has a thickness between the first surface and the second surface, wherein the rib projects away from the second surface a distance, and wherein the thickness is at least half of the distance.

24. The armrest of according to claim 23, wherein the thickness is approximately equal to the distance.

25. An armrest for a motor vehicle, comprising:
a support member attached to a fixed portion of the motor vehicle and configured to provide vertical support for the armrest under a vertical load applied by an arm of an occupant;
the support member including a plurality of grooves extending in a direction that is generally perpendicular to a lateral direction, the lateral direction being a direction between an occupant and the fixed portion of the motor vehicle; and
the support member further including a plurality of channels extending in a direction different from the direction perpendicular to the lateral direction,
wherein at least two channels of the plurality of channels each intersect at least two grooves of the plurality of grooves,
wherein the plurality of channels have an alternating configuration,
wherein at least one of the plurality of grooves is closed on either an upper surface of the support member or a lower surface of the support member, and
wherein the plurality of channels includes a first set of channels extending from a first side of the support member and wherein the plurality of channels includes a second set of channels extending from a second side of the support member, and wherein the first set of channels is interdigitated with the second set of channels.

26. The armrest according to claim 25, wherein longitudinal axes of the at least two channels intersect corresponding longitudinal axes of the at least two grooves at an angle that is not a right angle.

27. An armrest for a motor vehicle, comprising:
a support member attached to a fixed portion of the motor vehicle and configured to provide vertical support for the armrest under a vertical load applied by an arm of an occupant;
the support member including a plurality of grooves extending in a direction that is generally perpendicular to a lateral direction, the lateral direction being a direction between an occupant and the fixed portion of the motor vehicle; and
the support member further including a plurality of channels extending in a direction different from the direction perpendicular to the lateral direction,
wherein the plurality of channels are configured to intersect with the plurality of grooves
wherein at least one of the channels intersects at least two grooves such that it extends out from both sides of the at least two grooves, and
wherein the plurality of channels includes a first set of channels extending from a first side of the support member and wherein the plurality of channels includes a second set of channels extending from a second side of the support member, and wherein the first set of channels is interdigitated with the second set of channels.

28. The armrest according to claim 27, wherein an angle formed between a longitudinal axis of a first channel and a longitudinal axis of a first groove is an acute angle.

29. The armrest according to claim 27, wherein the support member includes a plurality of holes disposed on an outer periphery of the support member, and wherein a channel has an end open to a portion of a hole of the plurality of holes.

* * * * *